Dec. 6, 1955
C. H. CRAMER
2,725,852
TIME OPERATED FISH FEEDING DEVICE
Filed Feb. 27, 1953
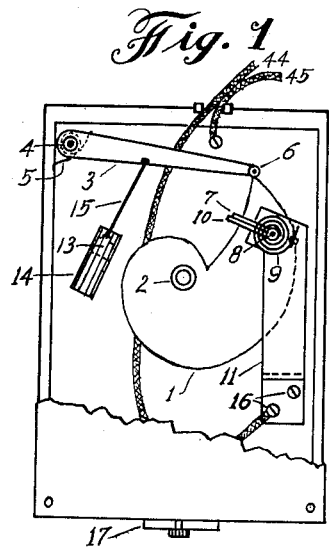
*Fig. 1*
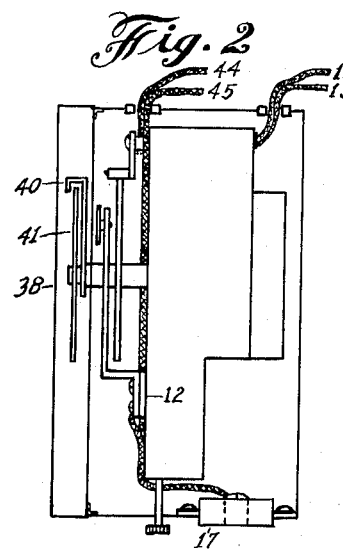
*Fig. 2*
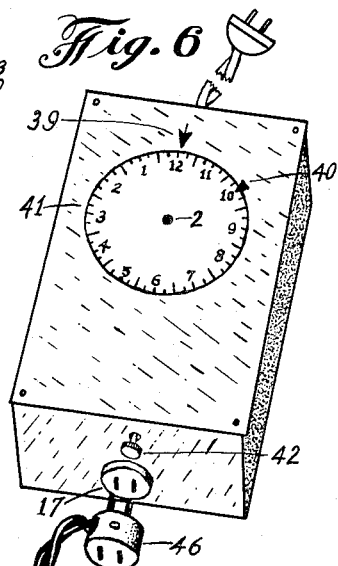
*Fig. 6*
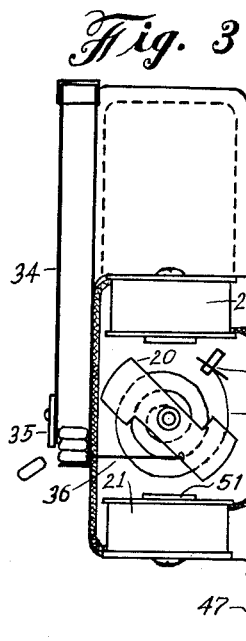
*Fig. 3*
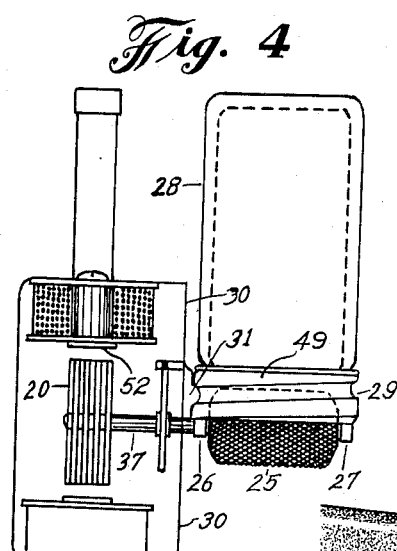
*Fig. 4*
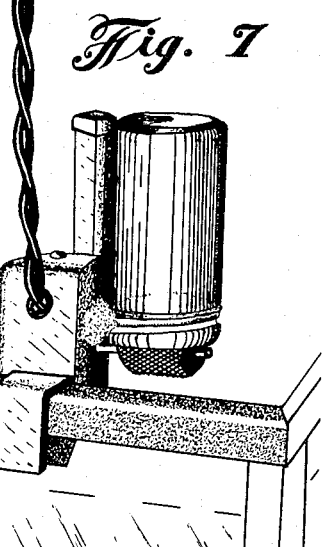
*Fig. 7*
*Fig. 5*
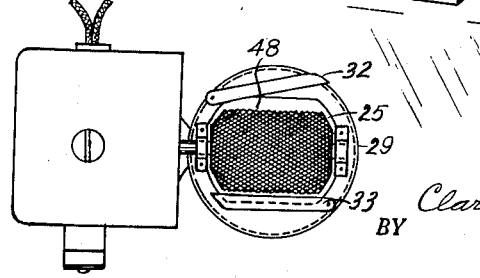
INVENTOR.
Clarence Henry Cramer,
BY

United States Patent Office 2,725,852
Patented Dec. 6, 1955

2,725,852

TIME OPERATED FISH FEEDING DEVICE

Clarence Henry Cramer, Akron, Ohio

Application February 27, 1953, Serial No. 339,396

2 Claims. (Cl. 119—51)

The object of my invention is to produce a machine that will automatically feed aquarium fish at a predetermined time, twice a day and in definite quantities. It will also feed two different forms or types of material (dry granulated and powdered material or pressed tablet material) either one separately or simultaneously. This is necessary because it is desirable sometimes to feed salt, special food, or medication along with the regular food at regular intervals. It is a further object that these operations be done completely automatic during the total absence of the keeper or aquarist, for a period up to thirty days under average conditions. However the period can be extended depending only on the size of the food containers and the size of the feeding.

The automatic aquarium fish feeder comprises two units. The timing contactor and the electromagnetic feed dispenser (hereinafter called the dispenser).

The timing contactor is illustrated by three views in the drawing, Fig. 1, Fig. 2, and Fig. 6. It consists of a standard self-starting electric clock movement to which a contactor is attached. The clock movement actuates the contactor every twelve hours. At such intervals the contactor makes a contact which completes the circuit and causes current to flow through the interconnecting wires, 43 Fig. 6, to one or more dispensers.

The dispenser is illustrated in the drawing by four views, Fig. 3, Fig. 4, Fig. 5, and Fig. 7, and consists of two food containers; Fig. 4, 28, for any kind of dry granulated and/or powdered material; and Fig. 3, 34, for dry soluble pressed tablet material. Both containers are operated simultaneously by the same magnetic device and will dispense their respective materials until empty. The dispenser is mounted by a bracket 60 over the aquarium or on the edge of same in such a position that when it is actuated by an electric current from the contactor, it will eject a predetermined amount of its contents into the aquarium at that time. Any number of these dispensers may be connected to the contactor (limited only by the current carrying capacity of the contactor) and will operate at the same time, permitting a number of aquariums to be served with any variety of food or material. Also more than one dispenser may be used on an aquarium where the size of the aquarium is large, or to satisfy special feeding needs.

Fig. 1 shows a top view of the timing contactor with the cover, dial, and sub-panel removed in order to show the inside mechanism. Fig. 2 is a side view of Fig. 1 with left hand side of case removed to show internal construction. Fig. 3 is a side view of the dispenser with side container removed in order to show more clearly the internal construction. Fig. 4 is a front view of Fig. 3 with panel cut away and showing container attached. Fig. 5 is a bottom view of Fig. 3 showing drum projections and gates. Figs. 6 and 7 show an isometric view of a complete assembly consisting of one timing contactor Fig. 6 with cover removed and connected to one dispenser Fig. 7, and mounted on the side of an aquarium. The cam 1 is pressed onto the hour spindle 2 of the clock, in place of the usual hour hand. Thus as the hour spindle rotates every twelve hours the cam also rotates. Contact arm 3 is pivoted at stud 4 and under tension of the torsion spring 5 which is also mounted on stud 4. As cam 1 rotates the contact stud 6 rides to the top of the cam at which point it drops to the low point on the cam, as a result of the tension exerted by spring 5. As contact stud 6 drops it makes a momentary contact with spring contact 7 for approximately one-fiftieth to one-half second. The spring contact is pivoted at 8. The coil spring 9 holds the contact 7 in the neutral position and returns it to neutral after it has been struck or displaced by the passage of stud 6 as it drops from the high point on the cam. To the back of spring contact 7 and parallel with it is attached a piece of insulation 10. This is to prevent contact stud 6 from making contact when it is riding up on the cam. Bracket 11 supports the whole spring contact assembly 7—8—9—10 and is mounted on the clock frame with two screws 16, but is insulated from it by insulator 12. A small piston 13 and closed cylinder 14 which comprises a sort of dashpot is connected to contact arm 3 by rod 15. Thus by virtue of the air escaping slowly past piston 13 the action of contact arm 3 is retarded so as to allow from 1/50 to 1/2 second contact time, which is required for proper operation of the dispenser. Part 17 is a standard female receptacle into which are plugged the stack up plugs 46 from one or more dispensers. Wires 18 and 19 are connected to the source of power. I do not wish to limit my feeder to any definite voltage because clock movements can be obtained for the various standard voltages and the coils in the dispenser can be wound for any of the respective voltages which it is desired to use. In fact for small capacity feeders with possible one or two dispensers attached the clock could be plugged into the standard 115 volts A. C. outlet and the dispenser can be wound to operate from a simple low voltage door bell transformer or battery. Thus the clock and dispensers can be operated from different types of current or both from the same supply.

Fig. 2 is a side view with the pointer 40, the dial 41, and the cover 38 in place. Wires 18 and 19 will connect to the proper voltage to run the clock motor. Wires 44 and 45 connect to the proper voltage to operate the dispenser.

Fig. 3 is a side view of the granulated food part of the dispenser with the side cut away showing armature 20 and the two electromagnetic coils 21 and 22 having poles 51 and 52 which when energized by the proper voltage will attract the ends of the armature and cause it to be turned from the slanting position shown in the drawing to a vertical position. The coiled torsion spring 23 holds the armature 20 in its slanting position of rest and returns it to the same position after operation. At stud 24 is an adjustment for positioning the armature. This adjustment also provides a means to vary the length of arc (5° to 70°) which the armature 20 describes during operation and which determines the quantity of food dispensed. Fig. 3 also shows a side view of the tablet dispensing part of the dispenser 34 which consists of a rectangular tube in which are stacked any food or other material in tablet form. An adjustment is provided at 35 for different thicknesses of tablets. The push rod 36 is connected to armature 20 so that when the armature moves into its vertical position a tablet is pushed out.

In Fig. 4 the threaded support ring 29 is rigidly attached to the motor housing 30 at point 31 by soldering or welding. The armature 20 and drum 25 are rigidly attached to shaft 37 and rotates on bearings 26 and 27 on the support ring. The food container 28 has a threaded open bottom 49 at the end, which is screwed into the support ring 29 and is removable for refilling.

Fig. 5 is a bottom view showing the drum 25 in its proper position in the bottom of the support ring 29. Gates 32 and 33 are each pivoted at one end so that by moving them closer or farther away from the drum the openings at both sides of the drum can be varied in size so as to permit finer or coarser grades of food to be dispensed. The drum 25 is provided with projections or heavy knurling 48 on its surface to rake the food from the container as it rotates forward and back during one cycle of operation describing a 5° to 70° arc.

The models which have been produced so far have been made of metal and glass however I do not wish to limit myself as to the kinds of material or size because I also intend to produce a small inexpensive type exactly like the above specification but made mostly of plastic.

In Fig. 6 the dial 41 and rotating pointer 40 rotates with the hour spindle 2 of the clock. The rotating pointer is fixed permanently to the spindle but the dial is friction mounted so that it can be turned with the fingers. In order to set the clock for time of operation (feeding time) the dial is rotated until the desired hour number is directly under the pointer 40. To set for time of day the hand set 42 on the clock is turned until the desired hour number coincides with the index mark 39 on the clock panel. The clock dial 41 is hour numbered in reverse of a standard clock because of the rotating dial feature.

I make no claim for the standard electric clock movement as part of my invention.

I claim:

1. In an automatic aquarium fish feeding machine, a cylindrical food container with a threaded open bottom, a support ring threaded to receive the said food container, a drum with projections, positioned centrally at the bottom of said mounting ring, for the purpose of raking or dispensing food from said container, an adjustable escape gate attached to supporting ring and positioned adjacent to the drum in order to permit the proper escape of fine or coarse textured food, an armature rotating forward and back in a circular and oscillatory movement and thereby describing a 5° to 70° arc between a pair of magnetic poles, which poles provide the power to operate the drum, a shaft mounted by bearings on each side of the drum and supporting an assembly consisting of the said drum and the said armature together with a torsion spring for returning said assembly to resting position after operation, an adjustment at the end of said spring to limit and control the degree of armature rotation, a pair of coils diametrically opposite to the axis of rotation, magnetically opposite in polarity, and spaced to permit movement of the armature between them, so that when the coils are energized by the proper electrical pulse the two ends of the armature will be magnetically influenced, producing the curvilinear motion necessary to turn the shaft assembly, a housing enclosing and supporting said coils, said armature, and said spring and attached permanently to the support ring of the food container, and a bracket providing means of mounting the complete mechanism to the top edge of an aquarium.

2. In an automatic fish feeding machine, a narrow tubular container with an opening at the side and near the bottom containing solid tablet food material stacked one upon the other inside the tube in a column so that when one tablet is pushed out of the said opening the column of tablets will drop, positioning another tablet at said opening ready for ejection, an adjustment at the said bottom providing means to accommodate different thicknesses of tablets, a push rod for ejecting said tablet material, an armature, to the upper arm of which is attached the end of said push rod, the rotation of said armature thus providing the thrust for ejection, a pair of electro-magnetic poles mechanically and electro-magnetically opposite and positioned so that they will attract the ends of said armature causing it to rotate and describe an arc of 5° to 70° when energized by the proper electrical pulse, a torsion spring to cause said armature to return to resting position after operation, an adjustment to limit and control the degree of rotation, a housing adapted to contain the said armature, said push rod and said poles and the outside of which is attached the said tubular tablet container, a bracket providing means of mounting to the edge of an aquarium.

References Cited in the file of this patent
UNITED STATES PATENTS

| | | |
|---|---|---|
| 1,175,788 | Martin | Mar. 14, 1916 |
| 1,355,399 | Kelley | Oct. 12, 1920 |
| 2,325,441 | Tucker et al. | July 27, 1943 |
| 2,538,413 | Chard | Jan. 16, 1951 |
| 2,700,489 | Sheft | Jan. 25, 1955 |